United States Patent [19]

Priniski et al.

[11] 4,055,807
[45] Oct. 25, 1977

[54] ANTENNA SWITCH

[75] Inventors: David Joseph Priniski, Hoffman Estates; Jerry David Meyerhoff, Buffalo Grove, both of Ill.

[73] Assignee: Motorola, Inc., Schaumburg, Ill.

[21] Appl. No.: 670,199

[22] Filed: Mar. 25, 1976

[51] Int. Cl.² .............................................. H04B 1/48
[52] U.S. Cl. ........................................ 325/21; 325/23
[58] Field of Search ............... 325/21, 22, 23; 333/13; 343/180

[56] References Cited

U.S. PATENT DOCUMENTS

| | | | |
|---|---|---|---|
| 2,939,949 | 6/1960 | Curtis | 325/21 X |
| 3,117,241 | 1/1964 | Paynter | 325/22 X |
| 3,327,215 | 6/1967 | Battin et al. | 343/180 X |

*Primary Examiner*—Benedict V. Safourek

*Attorney, Agent, or Firm*—James W. Gillman; Victor Myer; James P. Hamley

[57] ABSTRACT

The antenna of a transceiver couples through a low pass filter to the input port of a high pass filter network. The high pass network is designed to reflect a very high impedance to its input port when its output port is at ground potential. The transmitter portion of the transceiver couples to the input port of the network with the receiver coupling to the network output port. A semiconductor diode couples from the output port to ground potential.

In the receive mode the combination low pass and high pass filters couple received signals in the desired frequency band to the input of the receiver. Upon activation to the transmit mode the diode is forward biased whereby the network output port is taken to ground potential. In this mode the filter network effectively isolates the receiver from the transmitter.

16 Claims, 1 Drawing Figure

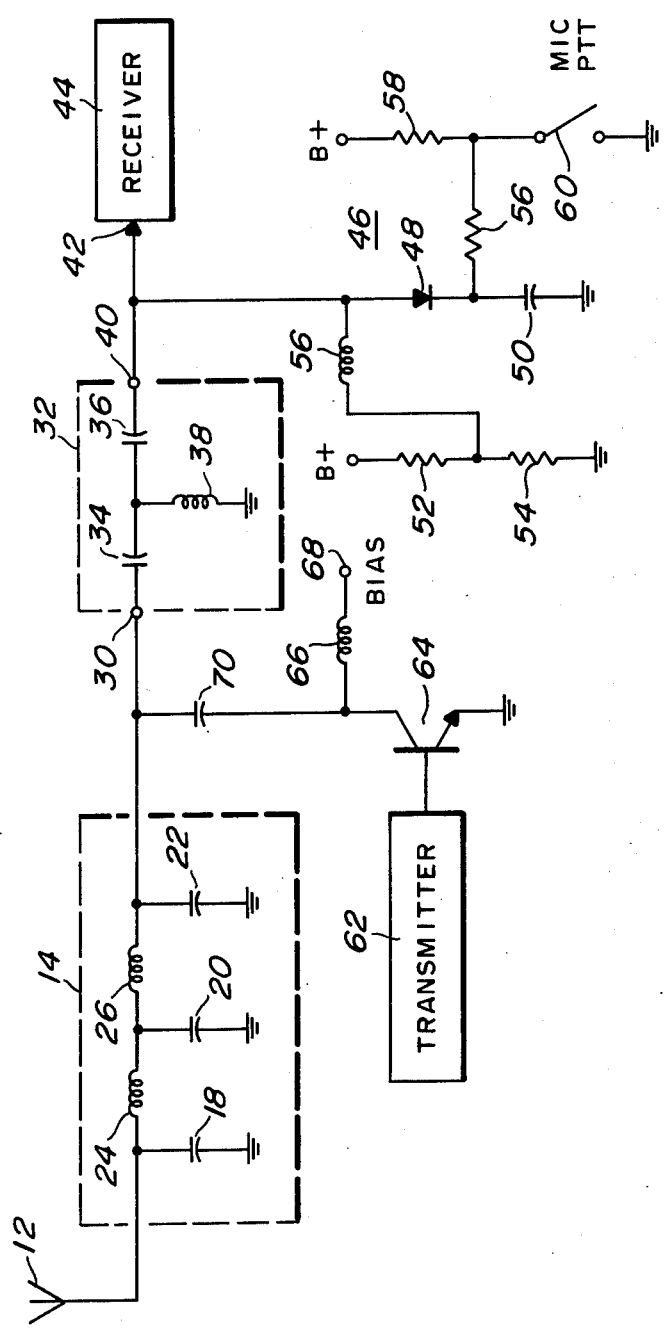

ANTENNA SWITCH

BACKGROUND OF THE INVENTION

The present invention pertains to the communication art and, in particular, to a means for switching an antenna to either a transmitter or a receiver.

Antenna switching systems are well known in the communication art. Such systems are commonly used in transceivers wherein a transmitter and receiver share a common antenna. The antenna switch must not only provide a means for routing the antenna to either the transmitter or the receiver, but it must also isolate the transmitter from the receiver such that, for example, in the transmit mode the receiver is not overloaded by the transmitted signal.

One prior art approach to antenna switching is the use of an electromechanical switch or relay. Such relays are not only expensive, but are also bulky and, thus, not ideally suited for limited space applications such as mobile transceivers. A further approach has been the use of PIN diodes in a biasing scheme whereby the diodes either connect or disconnect the receiver or transmitter to the antenna. The PIN diode switching schemes are expensive due to the cost of the diodes, and are generally complex to implement due to the sophisticated biasing scheme needed to properly control the diodes.

SUMMARY OF THE INVENTION

It is an object of this invention, therefore, to provide a means for effectively switching an antenna between a receiver and transmitter, which means also provides a simple yet effective way to isolate the receiver from the transmitter when the system is in the transmit mode.

Briefly, according to the invention, the antenna switch is operable in either a transmit or a receive mode, for switching an antenna to either a transmitter or a receiver, respectively. Both the transmitter and receiver are operable in a selected frequency band. The switch comprises a filter having an input and an output. The filter input couples to the antenna, with the filter output coupling to the receiver. The filter is designed to normally pass signals from the antenna to the receiver. Preferably, the filter has a high pass characteristic whereby signals below the desired frequency band are filtered out. However, when the output of the filter is taken near ground potential, the filter forms an antiresonant circuit having a very high impedance, in the frequency band, at its input. The transmitter couples to the filter input and a switching means is provided which grounds the filter output when the antenna switch is in the transmit mode. Thus, the receive mode signals are normally passed through the antenna to the receiver. However, upon activation to the transmit mode, the output of the filter is taken near ground whereby the input impedance to the filter becomes extremely high. This effectively decouples the receiver from the transmitter such that the transmitter energy is routed out over the antenna.

BRIEF DESCRIPTION OF THE DRAWING

The drawing illustrates, in schematic diagram form, the preferred construction of the antenna switch used in combination with a transmitter and receiver.

DESCRIPTION OF THE PREFERRED EMBODIMENT OF THE INVENTION

Referring to the drawing, an antenna 12 couples to a low pass filter 14. The low pass filter 14 is comprised of a sequence of shunt capacitors 18, 20, 22 in a pi circuit configuration with corresponding series inductors 24 and 26. The values of the capacitors 18, 20 and 22, and the inductors 24, 26, are selected in a well known manner to create a low pass characteristic for passing signals within and below a desired frequency band.

The output of the low pass filter 14 couples to the input port 30 of a high pass filter network 32. High pass filter network 32 is a "T" type filter having a pair of series capacitors 34, 36 with a shunt inductor 38 therebetween. The capacitors 34, 36 and the inductor 38 are of selected values to pass signals in the desired frequency band, and those signals thereabove from the input port 30 to an output port 40. In addition, when the output port 40 is taken near ground potential, the capacitor 36 and inductor 38 form an antiresonant tuned circuit, in the desired frequency band, which presents a high impedance through capacitor 34 to the input port 30 of the filter network 32.

The output port 40 of high pass filter network 32 couples to the input terminal 42 of a receiver 44. Also coupled to the output port 40 of filter network 32 is a switching means 46 which is comprised of a series connected diode 48 whose anode connects to output port 40 and whose cathode connects through an RF bypass capacitor 50 to ground potential. A bias is normally applied to diode 48 via a resistive divider consisting of a pair of resistors 52, 54 connected between a source of DC bias B+ and ground potential. An RF isolating inductor 56 connects between the common point of the resistors 52, and 54 and the anode of diode 48.

Coupling from the cathode of diode 48 is a series resistor divider comprised of a first resistor 56 and a second resistor 58 which couples to the aforementioned source of DC bias B+. The common point of the resistor 56, 58 connects to a manually operable switch 60 which also connects to ground potential. Switch 60 is, in the preferred construction of the invention, a push-to-talk switch normally found in combination with a hand-held microphone.

A transmitter 62 drives an output power stage comprised of transistor 64, whose collector connects both through an inductor load 66 to a bias potential 68 and through a coupling capacitor 70 to the input port 30 of the high pass filter network 32.

Circuit operation may be understood as follows. In the receive mode, the push-to-talk switch 60 is open (as shown) such that semiconductor diode 48 is biased to an off state, i.e. to a high impedance state. Thus signals received by antenna 12 are first low pass filtered by filter 14, high pass filtered by filter 32, and thereafter applied to the input terminal 42 of the receiver 44. The low pass filter 14 and high pass filter 32 provide bandpass protection against spurious signals located outside of the desired frequency band. Also, the component values of the low pass filter 14 and high pass filter 32 are selected whereby the impedance of the antenna is transformed to a proper value at the receiver input.

On activation to the transmit mode, push-to-talk switch 60 is suppressed whereby semiconductor diode 48 is forward biased to a low impedance state. Thus, the output port 40 of high pass filter 32 is coupled through capacitor 50 at or near the low impedance ground potential. This causes the capacitor 36 to resonate with inductor 38 whereby a very high impedance is reflected to the input port 30 of high pass filter 32. Now the transmitter, driving the output device 64, feeds directly through the pass filter 14 and out over the antenna 12. Due to the very high input impedance seen by the transmitter at input port 30 of high pass filter 32, very little power is transmitted through filter 32 and to the receiver 44. Thus, the receiver is seen to be effectively isolated from the transmitter 62 when the system operates in the transmit mode.

In summary, a simple yet effective switching system has been disclosed, which system effectively isolates the receiver from the transmitter when operating in the transmit mode.

While the preferred embodiment of the invention has been described in detail, it should become apparent to anyone of ordinary skill in the art, that many modifications and variations thereto are possible, all of which fall within the true spirit and scope of the invention.

We claim:

1. An antenna switch, operable in a transmit or receive mode, for switching an antenna to either a transmitter or a receiver, respectively, the transmitter and receiver being operable in a frequency band, the antenna switch comprising:
   a filter means, having an input and an output, the filter input being coupled to the antenna and the filter output being coupled to the receiver, the filter passing signals from the antenna to the receiver with the antenna switch in the receive mode, the filter forming an anti-resonant circuit to said frequency band, at its input, when its output is near ground potential, said filter means exhibiting a high pass characteristic for passing signals in said frequency band and at high frequencies when the antenna switch is in the receive mode;
   means for coupling the transmitter to the filter input; and
   means for grounding the filter output when the antenna switch is in the transmit mode.

2. The antenna switch of claim 1 further comprising:
   a low pass filter for passing signals at the frequency band and below; and, means coupling the antenna to the filter input through the low pass filter.

3. The antenna switch of claim 2 wherein the filter means has a high pass characteristic for passing signals in the frequency band and at higher frequencies when the antenna switch is in the receive mode.

4. The antenna switch of claim 1 wherein the filter is comprised of a "T" network having a pair of capacitors series coupled between the antenna and the receiver and an inductor in shunt with said capacitors.

5. The antenna switch of claim 1 wherein the means for grounding the filter output comprises:
   a semiconductor switch coupled between the filter output and ground potential; and
   bias means operable to bias the semiconductor switch to a low impedance state when the antenna switch is in the transmit mode, the bias means otherwise biasing the semiconductor switch to a high impedance state.

6. The antenna switch of claim 5 wherein the semiconductor switch is a diode, having its anode coupled to the filter output, and its cathode coupled to ground potential.

7. The antenna switch of claim 6 wherein the diode's cathode is coupled to ground potential through a capacitor which has a low impedance at the frequency band.

8. The antenna switch of claim 5 in combination with:
   a manually operable switch for activating the antenna switch to either the transmit or receive mode, said manually operable switch in circuit configuration with said bias means such that the semiconductor switch is in a low impedance state when the manually operable switch is in its transmit position and the semiconductor switch is in its high impedance state when the manually operable switch is in its receive position.

9. The antenna switch of claim 8 wherein the manually operable switch is in the push-to-talk switch in a microphone.

10. An antenna switching system comprising:
    an antenna means;
    a transmitter means operable in a frequency band and having an output terminal;
    a receiver means, operable in said frequency band and having an input terminal;
    a low pass filter, passing signals in said frequency band and therebelow;
    a high pass filter, having an input port and an output port, for passing signals in said frequency band and thereabove, said high pass filter exhibiting a very high impedance at its input port to signals in the frequency band when its output port is at a very low impedance;
    means for coupling the antenna through the low pass filter to the high pass filter input port;
    means for coupling the high pass filter output port to the receiver input terminal;
    means for coupling the transmitter output terminal to the high pass filter input port; and
    switching means operable in a transmit mode to switch the output port of the high pass filter to a low impedance, the operable in a receive mode to substantially isolate the filter output port from the low impedance,
    whereby when the switching means is in the transmit mode the high pass filter substantially decouples the receiver from the transmitter and antenna.

11. The system of claim 10 wherein the high pass filter is comprised of a "T" network having a pair of capacitors series coupled between the low pass filter and the high pass filter and an inductor in shunt with said capacitors.

12. The system of claim 10 wherein the switching means comprises:
    a semiconductor switch coupled between the high pass filter output port and a low impedance; and
    bias means operable to bias the semiconductor switch to a low impedance state when the switching means is in the transmit mode, the bias means biasing the semiconductor switch to a high impedance state when the switching means is in the receiver mode.

13. The system of claim 12 wherein the semiconductor switch is a diode, having its anode coupled to the filter output, and its cathode coupled to ground potential.

14. The system of claim 13 wherein the diodes cathode is coupled to ground potential through a capacitor which has a low impedance at the frequency band.

15. The system of claim 10 in combination with a manually operable switch for activating the switching means to either the transmit or receive mode.

16. The system of claim 15 wherein the manually operable switch is the push-to-talk switch in a microphone.

* * * * *